United States Patent [19]

Yang

[11] Patent Number: 4,864,177

[45] Date of Patent: Sep. 5, 1989

[54] STATOR LAMINATION DESIGN FOR TWO-POLE SINGLE-PHASE INDUCTION MOTOR

[76] Inventor: Tai-Her Yang, 5-1 Taipin St., Si-Hu Town,, Dzan-Hwa, Taiwan

[21] Appl. No.: 133,656

[22] Filed: Dec. 16, 1987

[51] Int. Cl.⁴ ............................................. H02K 1/16
[52] U.S. Cl. .................................. 310/216; 310/193; 310/254
[58] Field of Search ............... 310/193, 208, 216, 217, 310/218, 254, 256, 259; 336/214, 215

[56] References Cited

U.S. PATENT DOCUMENTS

| | | | |
|---|---|---|---|
| 3,921,017 | 11/1975 | Halleräck | 310/216 |
| 3,942,055 | 3/1976 | Hoffmeyer | 310/216 |
| 4,241,274 | 12/1980 | Brammerlo | 310/216 |

*Primary Examiner*—Patrick R. Salce
*Assistant Examiner*—D. L. Rebsch
*Attorney, Agent, or Firm*—Leonard Bloom

[57] ABSTRACT

Disclosed is a lamination design for the stator of an electric motor, especially a two-pole single-phase induction motor. The stator lamination has a substantially elliptical configuration, and the circumferential spacing between the adjacent winding slots is greater at the minor axis of the ellipse than at the major axis thereof.

3 Claims, 4 Drawing Sheets

STATOR LAMINATION DESIGN FOR TWO-POLE SINGLE-PHASE INDUCTION MOTOR

BACKGROUND OF THE INVENTION

Conventionally, the stator design for a two-pole, single phase alternating current induction motor may have an outline which is circular, in the form of a circle flattened along two diametrically opposite sides or flattened along four sides at opposite ends of orthogonal diameters. Still another conventional stator design has a hexagonal outline. In a circular stator, the magnetic material of the stator, normally iron, is distributed uniformly throughout the body of the stator. The axis of the magnetic poles thereof can be located along any diagonal of the cross section. In such a stator the flux density of the magnetic path of a stator pole is non-uniform, being dense at some points and sparse at others. Such designs are wasteful of magnetic material and result in a motor which is heavier and larger than it need be. Other conventional forms of stator design are usually more conservative of stator material than those of circular form, but still tend to be somewhat wasteful of material.

SUMMARY OF THE INVENTION

In accordance with the broad teachings of the present invention, there is herein illustrated and described a lamination for the stator of an electric motor, wherein the lamination has a planar configuration substantially in the form of an ellipse including a major axis and a minor axis. This elliptical lamination has a plurality of radially-oriented circumferentially-spaced slots formed therein for receiving coil windings, respectively. The circumferential space between adjacent slots is greater at the minor axis of the elliptical lamination than at the major axis thereof; and the amount of material on the lamination, radially outwardly to the slots, substantially decreases from the major axis to the minor axis of the elliptical lamination. As a result, the material in the lamination is substantially reduced, resulting in a substantial cost savings and weight reduction for the motor, while still achieving the desired electromagnetic characteristics of the motor.

In a preferred embodiment, the motor is a two-pole, single phase induction motor.

DESCRIPTION OF THE PREFERRED EMBODIMENTS

Figure 1:
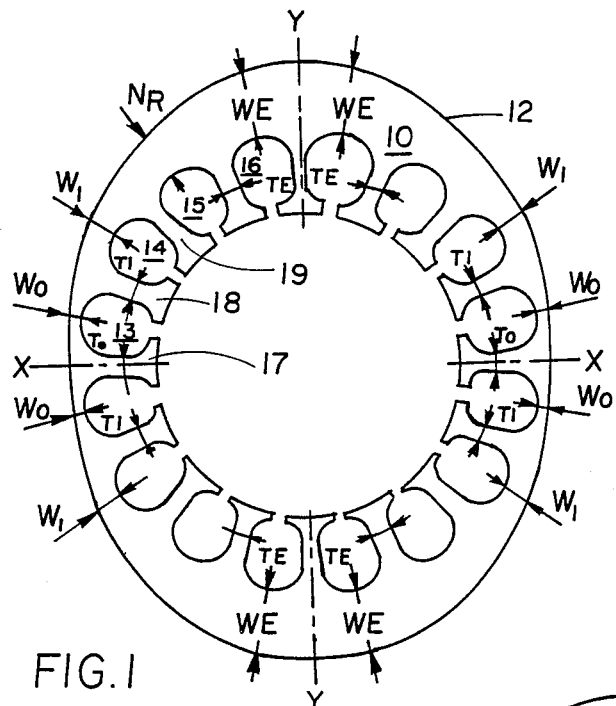
FIG. 1 is a plan view of a first embodiment of the invention illustrating a stator lamination of elliptical form.

FIG. 1 is a plan view of a first embodiment of the invention. A stator lamination 10 is shown having a circular inner edge 11 and an elliptical outer edge 12. The major axis of the elliptical outer form is positioned along the line Y—Y and the minor axis thereof is positioned along the line X—X. A plurality of openings 13, 14, 15, etc., hereinafter referred to as slots, are spaced circumferentially around the inner edge 11 of the lamination 10. The radially projecting portions 17, 18, 19, etc. separating each of the slots 13, 14, 15, etc. are hereinafter referred to as teeth. The portion of the lamination 10 outwardly of the slots 13, etc. and forming the outer periphery of the lamination is hereinafter referred to as the yoke.

As is conventional, a number of stator laminations are stacked with the slots thereof in alignment to form the body of a motor stator. Conductor coils are fitted into the aligned slots to extend longitudinally there through, transversely to the stator laminations. When the coils are properly interconnected, as is known in the art, and energized from a power source, magnetic poles will be established in the motor stator which provide the driving torque of the motor.

Figure 2:
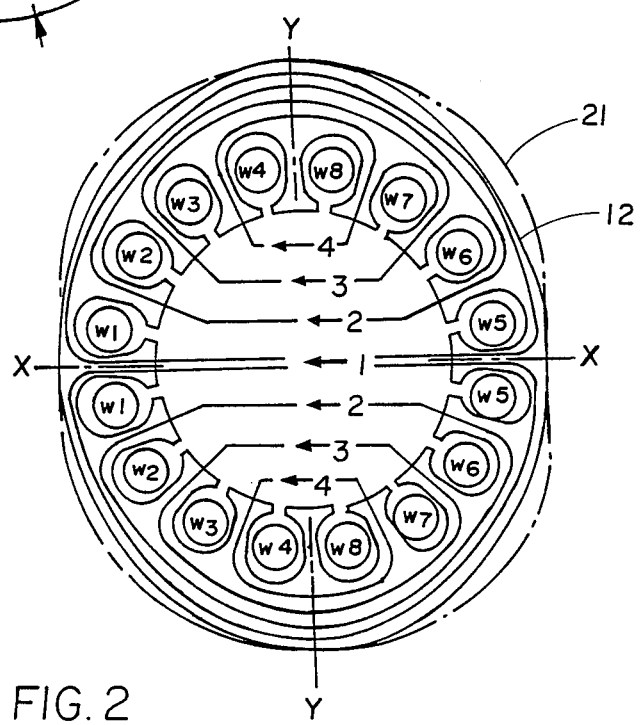
FIG. 2 is a cross section of a motor stator constructed of laminations of the form of FIG. 1 showing windings fitted in the stator slots and the lines of magnetic flux therein when the windings are connected to establish a pair of poles having an axis aligned with the axis X—X.

FIG. 2 is a cross section of a motor stator constructed of laminations of the form of FIG. 1 showing conductor coils W1—W5 fitted in the stator slots and interconnected to produce a pair of magnetic poles aligned along the axis X—X. The magnetic flux generated by the poles follows the lines 1-4. It will be seen that the concentration of flux is greatest in the portion of the stator yoke lying on the axis Y—Y and is least in the portion of the yoke lying on the axis X—X. It is known to be good practice to design a magnetic circuit so that the flux density therein does not exceed the saturation level at any point along the circuit path, the flux density being defined as flux/area, i.e. lines of magnetic force per unit cross sectional area of the magnetic path.

In conventional stator designs, the stator outline is circular and the cross sectional area of the yoke is constant and of such size that the flux density does not exceed the saturation level at any point. A known alternative stator design has an outline in the form of a flattened circle, the flattened portions of which lie along the axis of the magnetic poles, line X - X in FIG. 2. Dashed line 21 indicates the outline of a prior art stator of the flattened circular form. Both design forms of the prior art are wasteful of magnetic material in that the flux density is not maintained constant throughout the length of the magnetic path.

In accordance with the invention, width of the yoke outwardly of the slots, proceeding around the yoke from X to Y, is increased at each slot, thereby increasing the yoke area as each slot is encountered to accommodate the flux entering the yoke from the coil contained in that slot. The flux density is thus maintained constant throughout the yoke.

More specifically, referring to FIG. 1, the width of the yoke outwardly of each slot is determined in accordance with the following principles:

$W_o = T_o/2;$ $W_1 = T_o/2 + T_1 = W_o + T_1;$ $W_2 = T_o/2 + T_1 + T_2 = W_1 + T_2;$ etc.

$W_E = W_R + T_E$ where:

$W_o$ is the width of the yoke adjacent the slot 13 lying nearest the axis X—X;

$W_1$ is the width of the yoke adjacent to slot 14, second away from the axis X—X;

$W_E$ is the width of the yoke adjacent the slot lying nearest the axis Y—Y;

$W_R$ is the width of the yoke adjacent the slot second removed from the axis Y—Y;

$T_o$ is the width of the tooth 17 lying on the axis X - X;

$T_1$ is the width of the tooth 18 next adjacent tooth 17; and $T_E$ is the width of the tooth next adjacent to the tooth lying on the axis Y—Y.

The savings in magnetic material afforded by the invention over the flattened circular design form of the prior art is apparent from FIG. 2 as the difference between the area enclosed by line 21 and that enclosed by the line 12.

Figure 3:
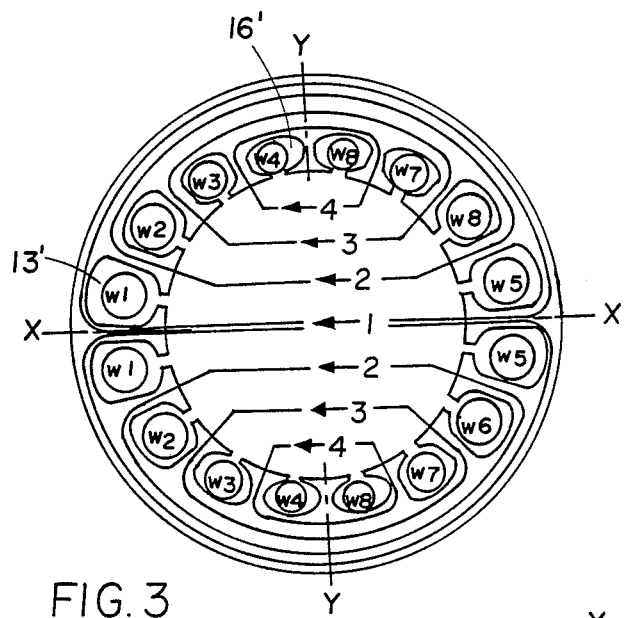
FIG. 3 is a plan view of a second embodiment of the invention in which the outline of the lamination is circular and the slots diminish in depth from the axis X—X to the axis Y—Y to distribute the stator material effectively elliptically.

FIG. 3 shows a second embodiment of the invention in which the outline of the stator is circular and the area of the yoke is progressively increased from the axis X—X to the axis Y—Y, effectively elliptically, by progressively diminishing the areas of the slots, beginning at the slots 13' closest the axis X—X and ending at the slots 16' closes the axis Y—Y.

FIG. 2 shows that the yoke width must be created along the axis Y—Y at right angles to the axis of the poles X—X. When two pairs of poles are provided, one pair for starting and the other pair for running, with the running pair aligned with the axis X—X and the starting pair aligned with the axis Y—Y, the width of the yoke along the axis X—X must be increased over that shown in FIG. 1.

Figure 4:
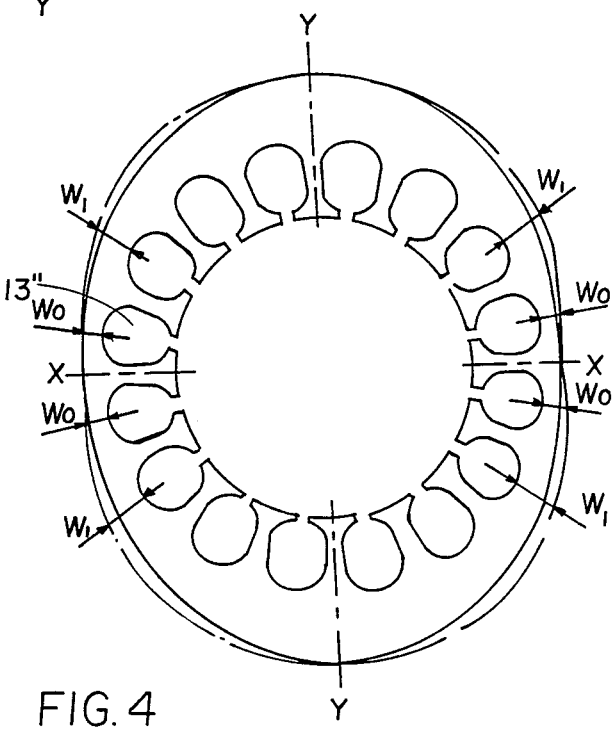
FIG. 4 is a plan view of a third embodiment of the invention in which the outline of the lamination is elliptical and the circumferential space between slots at the minor axis X - X of the ellipse is greater than the circumferential space between slots at the major axis Y—Y of the ellipse.

FIG. 4 shows a third embodiment of the invention in which additional yoke width along the axis X—X is provided while still preserving the elliptical outline of the stator. The area of the slots 13" closest the axis X—X is reduced from that shown in FIG. 1, thereby increasing the width $W_o$ of the yoke along the axis X—X.

Figure 5:
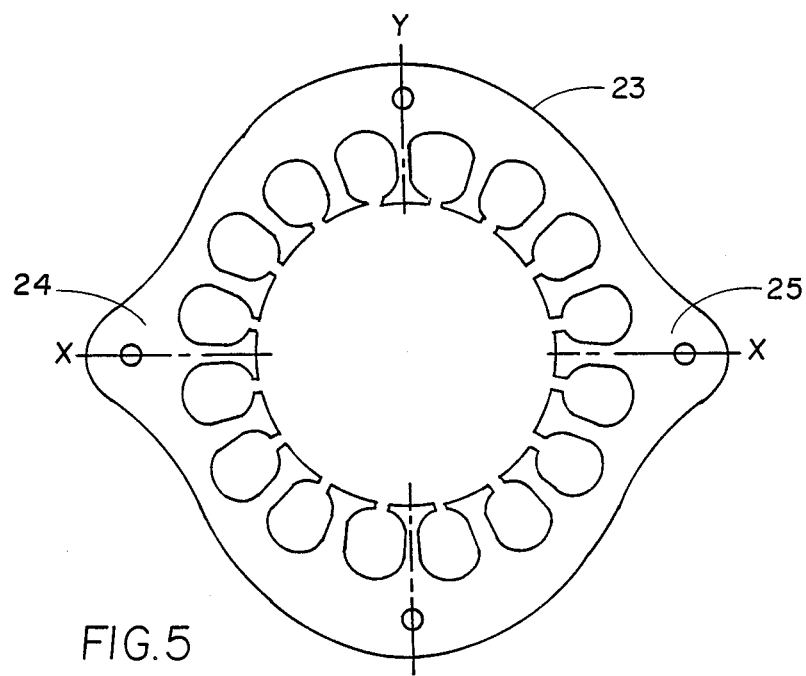
FIG. 5 is a plan view of a fourth embodiment of the invention in which the axis of one pair of poles lies along the line X—X and the axis of a second pair of poles lies along the line Y—Y and in which the outline of the lamination is generally elliptical with a major axis positioned along the axis Y—Y and with lobular extensions along the axis X—X.

FIG. 5 shows a fourth embodiment of the invention in which the outline 23 the stator is generally elliptical with a major axis positioned along the line Y—Y and with additional yoke width provided along the axis X—X by the lobes 24 and 25 extending along X—X.

Figure 6:
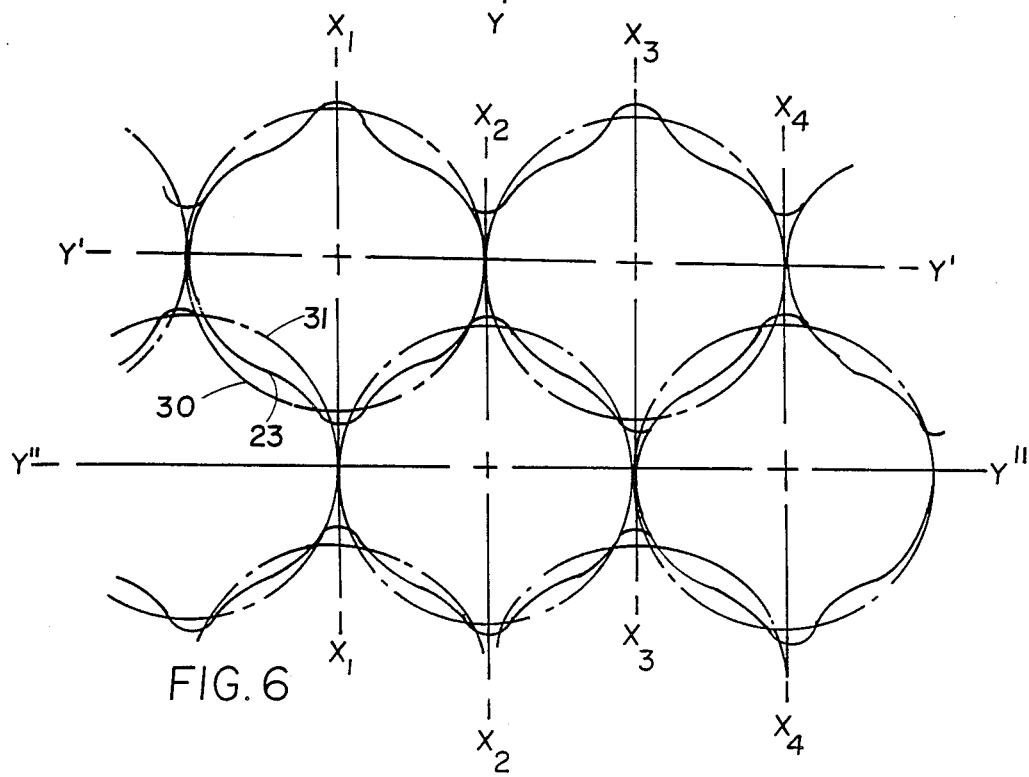
FIG. 6 is a layout for punching stator laminations of the form illustrated in FIG. 5 showing the material savings yielded by the design of FIG. 5.

FIG. 6 illustrates a plurality of stator laminations of the form of FIG. 5 laid out for stamping from a sheet of laminate material. The laminations are positioned contingently in horizontal rows with the major axis Y—Y thereof aligned along the parallel lines Y'—Y' and Y'—Y'". The axes X—X of the laminations in each row are separated by a distance equal to the length of the major axis of the ellipse of the lamination and fall on the lines $X_1$—$X_1$, $X_3$—$X_3$ in the top row and in alternate rows below the top row. The axis X—X of the laminations of the second row and in alternate rows below the second row fall on the lines $X_2$—$X_2$, $X_4$—$X_4$, which are separated from the lines $X_1$—$X_1$, $X_3$—$X_3$, by a distance equal to one-half the length of the major axis of the ellipse of the lamination. Thus the laminations of adjacent rows intermesh with one another complimentarily and enable the savings of a substantial amount of lamination material as compared to a lamination of circular form having a diameter equal the length of the major axis of the elliptical lamination. Such savings in material is apparent in FIG. 6 as the difference between the areas enclosed by the circles 30, 31 and the ellipses 23.

Figure 7:
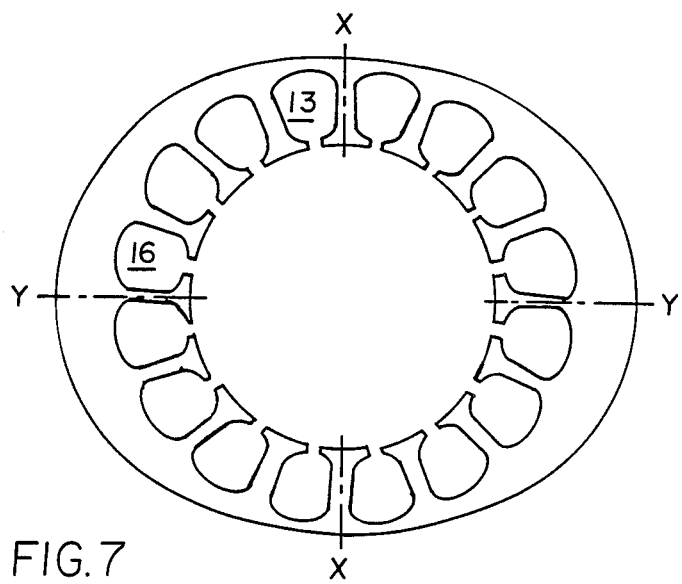
FIG. 7 is a simplified view of the stator lamination design shown in FIG. 1 represented for comparison with FIG. 8.
Figure 8:
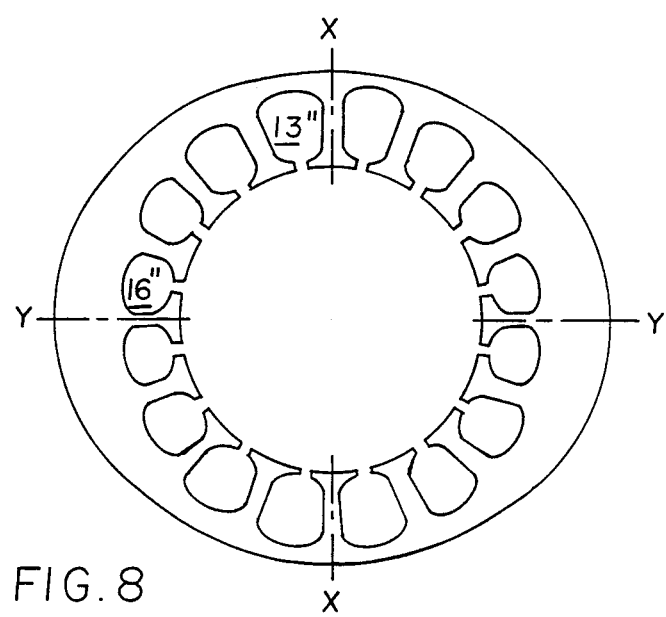
FIG. 8 is a plan view of a modification of the stator lamination design of FIG. 1 in which additional material is provided in the yoke along the axis Y—Y by reducing the area of the slots progressively from the axis X—X to the axis Y—Y.

FIG. 8 shows a modification of the stator lamination design of FIG. 1. FIG. 1 is represented in simplified form in FIG. 7 for comparison with FIG. 8. In FIG. 8 additional yoke width is provided along the axis Y—Y by progressively reducing the areas of the slots, commencing with the slots 13" nearest the axis X—X and ending with the slots 16" nearest the axis Y—Y. In this manner, additional yoke width may be provided along the axis Y—Y without enlarging the length of the major axis of the elliptical outline.

I claim:

1. In a stator for an electric motor, a lamination having a planar configuration substantially in the form of an ellipse including a major axis and a minor axis, the lamination having a plurality of radially-oriented circumferentially-spaced slots formed therein for receiving coil windings, respectively, the circumferential space between adjacent slots being greater at the minor axis of the elliptical lamination than at the major axis thereof, and the amount of material on the lamination, radially outwardly of the slots, substantially decreasing from the major axis to the minor axis of the elliptical lamination, thereby substantially reducing the material in the lamination, resulting in a substantial cost savings and weight reduction for the motor, while still achieving the desired electromagnetic characteristics of the motor.

2. The lamination of claim 1, wherein the motor comprises a two-pole, single-phase induction motor.

3. In a stator for an electric motor, a planar lamination having an outline which is symmetrical about two orthogonally intersection axes, X—X and Y—Y, respectively, said outline crossing said axis X—X at first and second points, said first and second points being separated from the point of intersection of said X—X axis by equal distances of a first amount, said outline crossing said axis Y—Y at third and fourth points, said third and fourth points being separated from the point of intersection of said Y—Y axis by equal distances of a second amount smaller than said first amount, first and second opposite sides of said outline at said first and second points, respectively, following first and second similarly shaped curves outwardly from said first and second points which diverge from said axis X—X and converge toward said axis Y—Y, third and fourth opposite sides of said outline at said third and fourth points following a curve outwardly from said third and fourth points which is substantially in the form of an ellipse having a major axis. extending from said third point to said fourth point, said third and fourth sides of said outline continuing along said elliptical curve to points of intersection and merger with said first and second sides of said outline.

* * * * *